(12) United States Patent
Baumert et al.

(10) Patent No.: US 8,583,040 B2
(45) Date of Patent: Nov. 12, 2013

(54) DEVICES, SYSTEMS, AND METHODS FOR CONFIGURING A WIRELESS DEVICE

(75) Inventors: Joel Baumert, Eden Prairie, MN (US); Bill Kumpf, Bloomington, MN (US)

(73) Assignee: Digi International Inc., Minnetonka, MN (US)

( * ) Notice: Subject to any disclaimer, the term of this patent is extended or adjusted under 35 U.S.C. 154(b) by 174 days.

(21) Appl. No.: 12/895,903

(22) Filed: Oct. 1, 2010

(65) Prior Publication Data

US 2012/0083228 A1    Apr. 5, 2012

(51) Int. Cl.
    *H04B 7/00*    (2006.01)
(52) U.S. Cl.
    USPC ........... 455/41.2; 455/418; 455/419; 370/328
(58) Field of Classification Search
    USPC ............. 455/41.2, 41.3, 41.1, 418, 419, 90.3; 370/328
    See application file for complete search history.

(56) References Cited

U.S. PATENT DOCUMENTS

| | | | | |
|---|---|---|---|---|
| 4,462,113 A | * | 7/1984 | Iwata | 455/20 |
| 5,237,663 A | * | 8/1993 | Srinivasan | 710/305 |
| 5,838,226 A | * | 11/1998 | Houggy et al. | 340/12.32 |
| 5,954,817 A | * | 9/1999 | Janssen et al. | 713/169 |
| 6,131,040 A | * | 10/2000 | Knuutila et al. | 455/550.1 |
| 6,175,860 B1 | * | 1/2001 | Gaucher | 709/208 |
| 6,509,913 B2 | * | 1/2003 | Martin et al. | 715/762 |
| 6,728,531 B1 | * | 4/2004 | Lee et al. | 455/419 |
| 6,748,278 B1 | * | 6/2004 | Maymudes | 700/17 |
| 7,463,877 B2 | * | 12/2008 | Iwamura | 455/402 |
| 7,463,907 B2 | * | 12/2008 | Smith et al. | 455/562.1 |
| 7,486,648 B1 | | 2/2009 | Baranowski | |
| 7,853,221 B2 | * | 12/2010 | Rodriguez et al. | 455/74 |
| 8,041,369 B2 | * | 10/2011 | Smith et al. | 455/456.1 |
| 2002/0068558 A1 | * | 6/2002 | Janik | 455/422 |
| 2003/0078072 A1 | | 4/2003 | Serceki et al. | |
| 2003/0198208 A1 | * | 10/2003 | Koos et al. | 370/338 |
| 2004/0174900 A1 | | 9/2004 | Volpi | |

(Continued)

FOREIGN PATENT DOCUMENTS

| | | |
|---|---|---|
| DE | 202005004352 U1 | 7/2005 |
| DE | 102006030797 A1 | 1/2008 |

(Continued)

OTHER PUBLICATIONS

"European Application Serial No. 11183626.8, Office Action mailed Feb. 1, 2012", 10 pgs.

(Continued)

*Primary Examiner* — Lewis West
(74) *Attorney, Agent, or Firm* — Fogg & Powers LLC

(57) ABSTRACT

Various embodiments include a devices, systems, and methods to configure a wireless device. A wireless device may comprise a housing, a wireless communication interface, and a configuration interface. The housing may be configured to be mounted to an outlet supplying power to the wireless device via an electrical conductor. The wireless communication interface may be capable of connecting the wireless device to a wireless network. The configuration interface may be coupled to both the electrical conductor and the wireless communication interface and communicate with a configuration device directly attached to the electrical conductor. The configuration device may communicate configuration instructions to the wireless device over the electrical conductor by modulating power on the electrical conductor. The configuration interface may configure the wireless interface to connect the wireless device to the wireless network based on the configuration instructions.

31 Claims, 6 Drawing Sheets

(56) References Cited

U.S. PATENT DOCUMENTS

| | | | |
|---|---|---|---|
| 2004/0212500 A1 | 10/2004 | Stilp | |
| 2004/0235468 A1* | 11/2004 | Luebke et al. | 455/426.1 |
| 2004/0253945 A1* | 12/2004 | Janik | 455/419 |
| 2005/0044372 A1 | 2/2005 | Aull et al. | |
| 2005/0136972 A1* | 6/2005 | Smith et al. | 455/554.1 |
| 2005/0271128 A1 | 12/2005 | Williams et al. | |
| 2006/0104291 A1* | 5/2006 | Rodriguez et al. | 370/401 |
| 2006/0187023 A1* | 8/2006 | Iwamura | 340/538.11 |
| 2007/0197262 A1* | 8/2007 | Smith et al. | 455/562.1 |
| 2007/0293208 A1* | 12/2007 | Loh et al. | 455/419 |
| 2008/0057931 A1* | 3/2008 | Nass et al. | 455/419 |
| 2008/0224892 A1 | 9/2008 | Bogolea et al. | |
| 2008/0278327 A1* | 11/2008 | Nierenberg et al. | 340/572.1 |
| 2009/0010178 A1* | 1/2009 | Tekippe | 370/254 |
| 2009/0088907 A1 | 4/2009 | Lewis et al. | |
| 2009/0140861 A1* | 6/2009 | Caliri et al. | 340/572.1 |
| 2009/0174569 A1* | 7/2009 | Smith et al. | 340/825.49 |
| 2009/0243869 A1 | 10/2009 | Sanderford, Jr. | |
| 2009/0298490 A9* | 12/2009 | Janik | 455/419 |
| 2010/0130142 A1* | 5/2010 | Schubert | 455/90.3 |
| 2010/0156665 A1 | 6/2010 | Krzyzanowski et al. | |
| 2010/0232400 A1* | 9/2010 | Patil et al. | 370/337 |
| 2011/0084809 A1* | 4/2011 | Perkins | 340/10.1 |
| 2011/0287757 A1* | 11/2011 | Nykoluk et al. | 455/419 |
| 2011/0298301 A1* | 12/2011 | Wong et al. | 307/116 |
| 2011/0316717 A1 | 12/2011 | Young et al. | |
| 2011/0320636 A1 | 12/2011 | Young et al. | |

FOREIGN PATENT DOCUMENTS

| | | |
|---|---|---|
| EP | 2134112 A1 | 12/2009 |
| WO | WO-03/047122 A1 | 6/2003 |
| WO | WO-2008001146 A1 | 1/2008 |
| WO | WO-2008092268 A1 | 8/2008 |
| WO | WO-2009/005807 A1 | 1/2009 |
| WO | WO-2011163569 A2 | 12/2011 |
| WO | WO-2011163569 A3 | 12/2011 |

OTHER PUBLICATIONS

"International Application Serial No. PCT/US2011/041782, Search Report mailed Dec. 28, 2011", 4 pgs.

"International Application Serial No. PCT/US2011/041782, Written Opinion mailed Dec. 28. 2011", 7 pgs.

"U.S. Appl. No. 11/773,266, Non-Final Office Action mailed Sep. 20, 2010", 17 pgs.

"U.S. Appl. No. 11/773,266, Final Office Action mailed Mar. 23, 2011", 19 pgs.

"U.S. Appl. No. 11/773,266, Response filed Dec. 20, 2010 to Non Final Office Action mailed Sep. 20, 2010", 12 pgs.

"European Application Serial No. 08779932.6, Office Action mailed Feb. 10, 2011", 6 pgs.

"European Application Serial No. 08779932.6, Office Action mailed Jun. 1, 2010", 7 pgs.

"European Application Serial No. 08779932.6, Office Action Response Filed Sep. 14, 2010", 4 pgs.

"International Application No. PCT/US2008/008207, International Preliminary Report on Patentability", (Jan. 14, 2010), 10 pgs.

"International Application Serial No. PCT/US2008/008207, International Search Report Mailed on Nov. 25, 2008".

"International Application Serial No. PCT/US2008/008207, International Written Opinion Mailed on Nov. 25, 2008".

"LZR01D01 ZigBee Router—Logitech (Taiwan)", http://www.logi.com.tw/index_files/Page695.htm, (Unknown; prior to May 7, 2007), 1 page.

"Referenzhandbuch fur den RangeMax Wireless Router WPN824", NETGEAR, Inc., Santa Clara, CA 95054 USA, ftp://ftp.netgear.de/download/WPN824/WPN824-FullManualdeutsch.pdf, (May 2005), i to x and 1-1 to 2-9.

Gutierrez, J. A, et al., "IEEE 802.15.4:Developing Standard for Low-Power Low-cost Wireless Personal area Networks", IEEE Network, IEEE Service Center, (Sep. 1, 2001), pp. 12-19.

Jin-Shyan L, et al., "ITRI Zbnode : A Zig Bee /IEEE 802.15.4 Platform for Wireless Networks", System, Man and Cybernetics, (Oct. 1, 2006), pp. 1462-1467.

Lee, Jin-Shyan, et al., "ITRI ZBnode: A ZigBee/IEEE 802.15.4 Platform for Wireless Sensor Networks", IEEE International Conference on Systems, Man and Cybernetics, 2006. SMC '06, vol. 2, (2006), 1462-1467.

NETGEAR, Inc, "Refrenzhandbuch fur den Range Max Wireless Router WPN824", (May 2005), pp. 1-9.

"U.S. Appl. No. 12/823,309, Notice of Allowance mailed Oct. 17, 2012", 5 pgs.

"U.S. Appl. No. 12/823,309, Response filed Sep. 20, 2012 to Non Final Office Action mailed Jun. 20, 2012", 12 pgs.

"U.S. Appl. No. 12/823,333, Response filed Dec. 6, 2012 to Non Final Office Action maied Jul. 6, 2012", 11 pgs.

"European Application Serial No. 11183626.8, Response filed Oct. 4, 2012 to Extended Search Report mailed Feb. 1, 2012", 12 pgs.

* cited by examiner

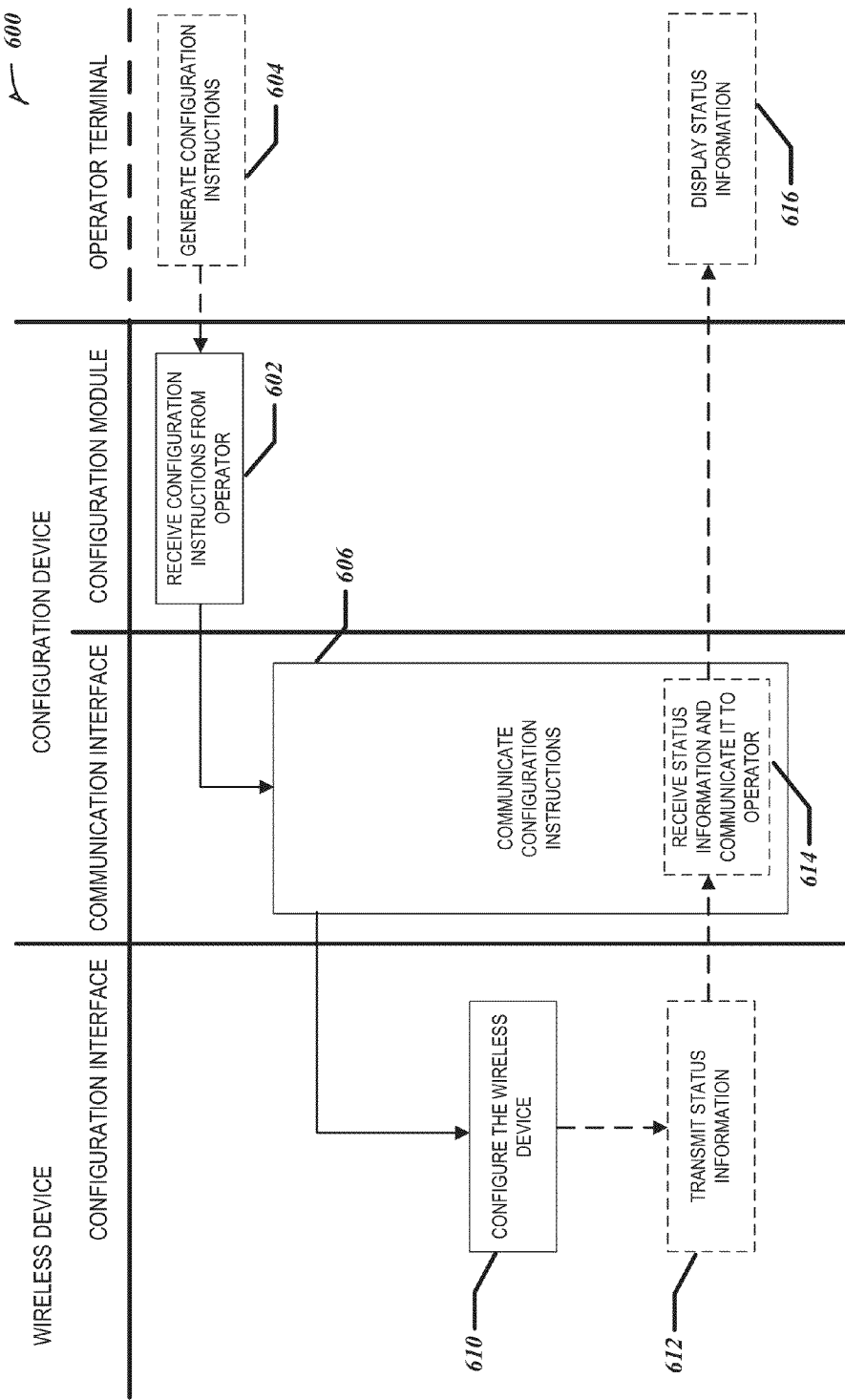

DEVICES, SYSTEMS, AND METHODS FOR CONFIGURING A WIRELESS DEVICE

TECHNICAL FIELD

This document pertains generally to wireless devices, and more particularly, but not by way of limitation, to devices, systems and methods for configuring wireless devices.

BACKGROUND

Wireless devices which communicate with each other and are part of wireless networks must often be configured to participate in a wireless network. Configuration may include a unique address for the device on the network, the radio frequencies upon which the device should operate, and other parameters which may change from network to network. In some instances the wireless devices may be utility devices, without direct user input during their normal operation, which may be placed in user accessible, or public, places where they may be subjected to malicious or accidental interference. Often, these utility devices are intended to be configured by a network installer when they are installed and then left to run without further physical intervention. Example devices may include Smart Energy ("SE") devices deployed in a home or business and communicating in a mesh network to report on and control the energy use of the installation site.

A wireless device generally requires some network information before it can connect to a given network. In some cases, the device is pre-configured with network parameters when it is manufactured. More often, however, the wireless device allows for some pre-connection configuration. Often, especially for small wireless devices such as those used in SE networks, the configuration interface may consist of a few buttons and limited feedback to the installer, where the installer inputs the configuration parameters in a slow and time consuming "Morse code" like process.

OVERVIEW

In systems having a wireless device and a configuration device, it can be advantageous for the wireless device to have a configuration interface coupled to two communication mechanisms for the wireless device (e.g., a first and a second communication interface) and for the configuration device to have configuration module and a communication interface capable of communicating with one of the wireless device's communications mechanisms (e.g., the first communications mechanism). The configuration module may receive configuration instructions from an operator via the configuration module. The configuration device may then communicate, using the communication interface, the configuration instructions to the wireless device. The wireless device, using the received configuration instructions and the configuration interface, may then configure the communications mechanism that was not utilized by the configuration device to transmit the configuration instructions (e.g., the second communications mechanism). After configuration, the second communications mechanism may allow the wireless device to connect to a wireless network.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments and examples discussed in the present document.

FIG. 6 illustrates a swim-lane flowchart for an example method to configure a wireless device.

DETAILED DESCRIPTION

Figure 1:
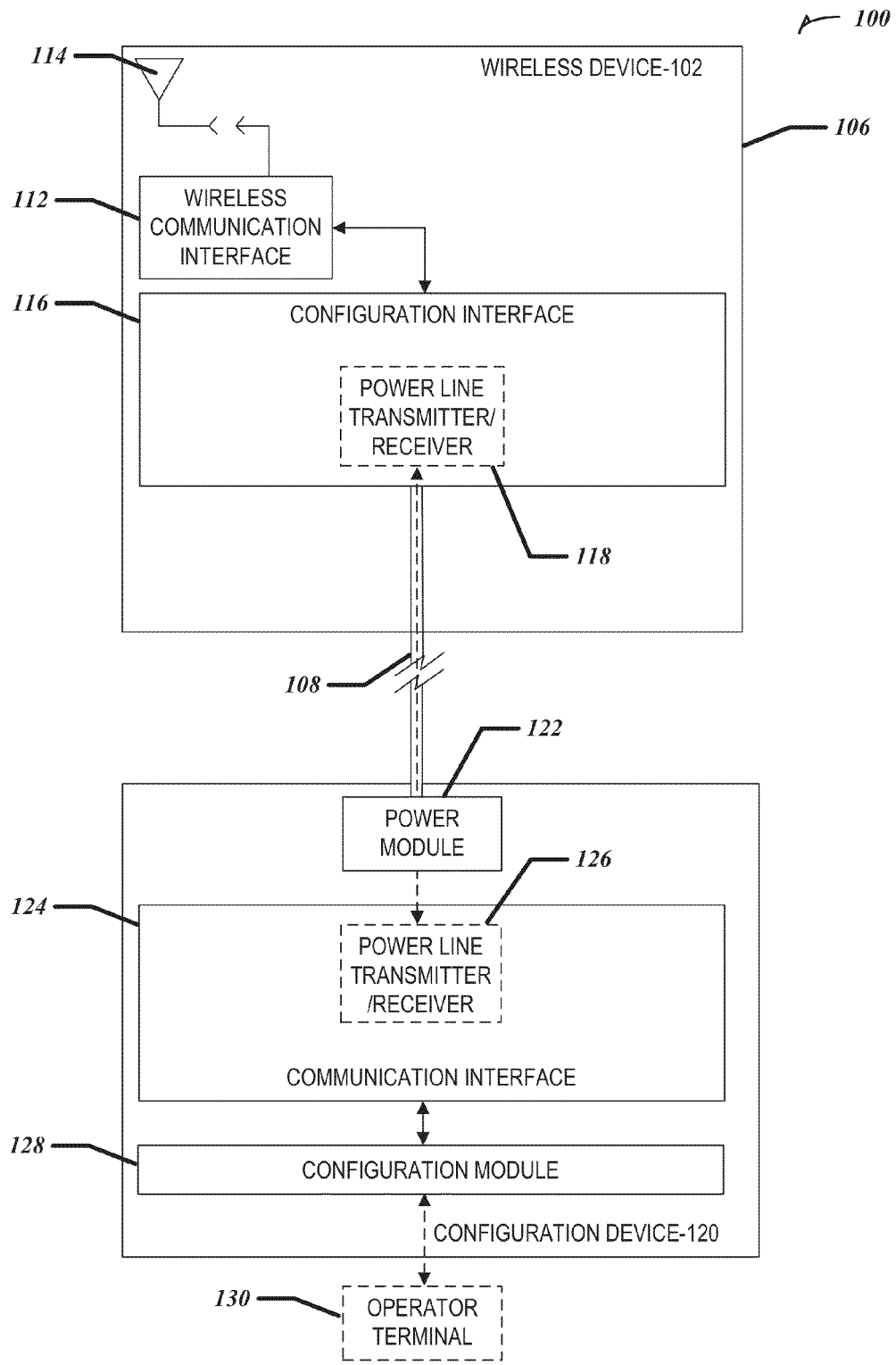
FIG. 1 illustrates a block diagram of example components in a wireless device and a configuration device according to one embodiment.

Wireless devices deployed to attach to a given wireless network may need additional configuration above and beyond that with which they are manufactured. If the device is small, and not intended to be physically manipulated during normal operation, it may be advantageous to provide a configuration mechanism that is both rich and secure from accidental or malicious mis-configuration by a person.

A rich configuration mechanism may include such features as a user interface and a set of configuration instructions which allow for direct and easy manipulation of configuration parameters. For example, a user interface where the operator may simply type a network address for the wireless device into a field associated with that parameter—compare with a few buttons and a small status display on the wireless device where the operator may have to strike a button a certain number of times for each numeral or character in the address along with cumbersome and repetitive button pushes to even navigate to the address entry.

It may also be advantageous to limit the configuration mechanism to those mechanisms which do not breach the wireless device's housing more than may be required to power the wireless device. For example, infrared, power line, induction, and radio frequency ("RF") based connections to a configuration device may allow the wireless device to maintain a sealed housing—unlike USB, serial, or other wired connections—which may both assist in a more robust wireless device as well as reducing manufacturing costs; manufacturing costs being reduced because the lack conductors leaving the wireless device obviate complicated power supply isolation procedures to ensure operator safety. Further, communication mechanisms which may physically address the wireless device (e.g., infrared is line of sight, power line is directly wired, and induction is short ranged) obviate the need for complex connection logic between the wireless device and the configuration device allowing for a simple and uniform pre-configuration of the wireless device at the point of manufacture. In some instances, more complicated pre-configuration to allow the wireless device to connect to the configuration device using RF may be used. In these cases, the known and stable condition of configuration device networking may allow for uniform RF pre-configuration of the wireless device while still allowing for great flexibility as to configuring the wireless device's other wireless communications mechanisms at installation.

The configuration device may also advantageously hold the wireless device proximate to its operating position (i.e., the position the wireless device will occupy while performing its functions after it is configured) in its environment, further providing assurances to an operator that the configured device will operate as expected based on the configuration process. For example, wireless connectivity to the network for a wireless device in its operating position, as observed during the configuration process, will be similar—nearly identical—for a wireless device configured proximate to its destined operating position as opposed to a wireless device which was configured elsewhere and later installed in its operating position. Sealing the wireless device's housing and configuring it using a separate configuration device connected to the wireless device which does not breach the wireless device's housing may create a robust wireless device which is resistant to accidental of malicious tampering, and which is also less expensive to manufacture while providing a flexible mechanism to configure the wireless device for a variety of network situations.

FIG. 1 illustrates a block diagram of example components in a system 100 with a wireless device 102 and a configuration device 120 according to one embodiment.

Wireless device 102 may have a housing 106, a wireless communication interface 112, and a configuration interface 116. In some examples, the housing 106 may be sealed closed (e.g., by welding, adhesive, shrink wrapping, gaskets, etc.). In some examples the housing 106 may be permanently sealed and closed, where permanently sealed and closed means that the housing cannot be opened under normal circumstances (e.g., there is no mechanism to open the housing such as a latch, lever, or button), although extraordinary measures such as cutting, smashing, or other trauma to the housing may result in its opening. In other words, if the housing is permanently sealed and closed, the housing must be broken to unseal and open it. In some examples, the housing 106 is configured to be mounted to an outlet supplying power to the wireless device 102 via an electrical conductor 108. In some examples, the only electrical conductors 108 exiting the housing 106 are associated with a mains power connection; other external connections with conductors (e.g., serial cable or USB connections) are therefore absent. Eliminating external conductors, in some examples, may provide for a cheaper and easier manufacturing of the wireless device 102 by eliminating the need to isolate the mains power connection 108 from the external conductors (e.g., by packaging the mains power connection 108 separately within the wireless device 102). Also, because additional isolation or packaging is not required for the mains power connection 108, the overall size of the wireless device 102 may be reduced. Further, the lack of external conductors may allow for more robust construction of the wireless device 102, because physical connection points are often weaker, may work to break the sealed housing with use over time (e.g., physical insertion and removal of the cable may pry the housing apart or create gaps in between the housing and the connector), and may be fouled accidentally or maliciously by people in the environment in which the wireless device 102 is deployed.

Wireless communication interface 112 may be coupled to an antenna 114 and be capable of connecting the wireless device 102 to a wireless network. In some examples, antenna 114 may be within the housing 106. In some examples, antenna 114 may be external to the housing. In some examples, an external antenna 114 may be sealed with the housing 106 such that the housing's seal is not broken by the antenna 114. In some examples, the wireless network is a mesh network, such as a ZigBee protocol network. In other examples, the wireless network may be a WiFi network, or cellular network, among others. In some examples, the wireless communication interface 112 may include hardware and software to connect to one or more wireless networks via one or more communications mechanisms.

Configuration interface 116 may be coupled to the electrical conductor 108 and the wireless communication interface 114. In some examples, the configuration interface 116 may communicate with a configuration device 120 directly connected to the electrical conductor 108. The communication between the wireless device 102 and the configuration device 120 may be carried out over the electrical conductor 108 by modulating power on the electrical conductor 108. In some examples, the configuration interface 116 may include a power line transmitter and receiver 118 to communicate over the electrical conductor 108. The configuration interface 116 may contain software and hardware to drive the power line transmitter and receiver 118. In some examples, the power line communications protocol may be a zero crossing communication over power line protocol. In some examples, the power line protocol may implement the X10 power line communication protocol. It may be advantageous to use a power line communications protocol over the electrical conductor 108 because it may provide the security and signal isolation of a directly wired connection without breaching a sealed housing 106 of the wireless device 102. Further, it may provide reuse of an interface that is already a part of the wireless device 102, namely the mains power connection 108.

Configuration interface 116 may receive configuration instructions from the configuration device 120 over the electrical conductor 108. The configuration interface 116 may then configure the wireless communication interface 112 to connect to the wireless network based on the configuration instructions. In some examples, the configuration interface 116 may communicate status information to the configuration device 120. In some examples, the status information may include wireless signal strength, or diagnostic information from the wireless device 102 (e.g., operating parameters, error conditions, serial number, etc. of the wireless device).

Configuration device 120 may have a power module 122, a communication interface 124, and a configuration module 128.

Power module 122 may provide electrical power to the wireless device 102 via the electrical conductor 108. In some examples, the electrical power comes from a mains power outlet. In other examples, the electrical power comes from a battery (not shown) in the configuration device 120. In some examples, the battery also supplies power to the configuration device. Using a battery to power the wireless device 102 may allow an operator to move around a deployment environment with the wireless device 102, observing good and bad areas for the wireless device's 102 operation (e.g., good wireless connectivity and little interference, among other factors). Thus, mains power outlets may be quickly identified as possible locations to deploy the wireless device 102.

Figure 3:
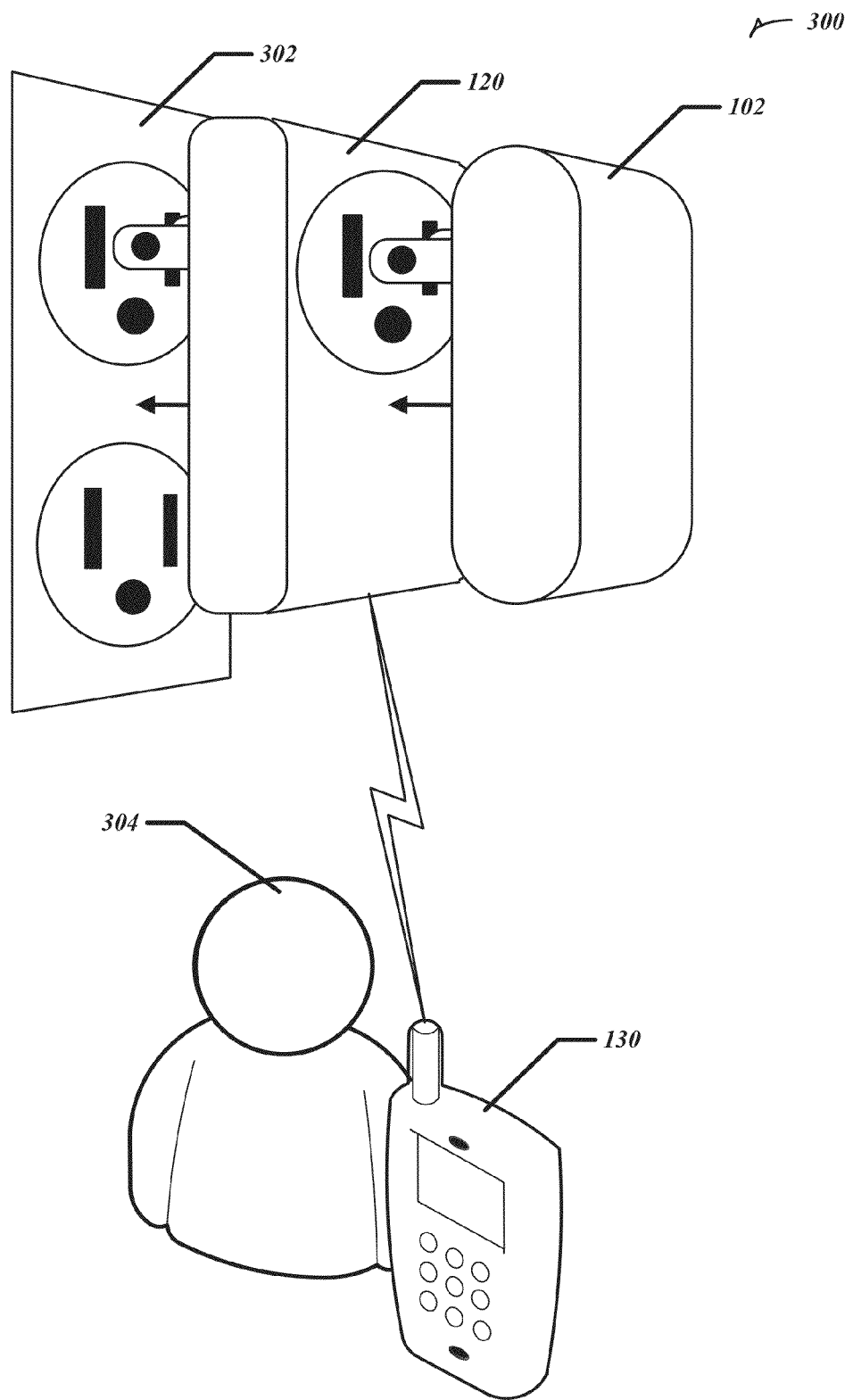
FIG. 3 illustrates an example system to configure to configure a wireless device.

Power module 122, in some examples, may be designed to be placed between the wireless device 102 and a mains power outlet 302 supplying power to the configuration device 120, as shown in FIG. 3. In some examples, power module 122, or the configuration device 120, may hold the wireless device 102 proximate to a mains power outlet. In some examples, "proximate" means close enough for the wireless device's 102 wireless network characteristics to be equivalent to those characteristics of the wireless device 102 if it were plugged directly into the outlet. By holding the wireless device proximate to the mains power outlet, an operator may be able to determine if a particular outlet will suit the wireless device's 102 operation (e.g., good wireless connectivity, little interference, unobtrusive physical location, among others).

Communication interface 124 may communicate, bi-directionally, with the wireless device 102 via the electrical conductor 108 by modulating power on the electrical conductor 108. In some examples, the communication interface 124 may have a power line transmitter and receiver 126 that operate similarly to the power line transmitter and receiver 118 previously described with respect to the wireless device 102, except that the power line transmitter and receiver 126 may operate through the power module 122.

Configuration module 128 may be implemented in software, hardware, or both. In some examples, the configuration module 128 is configured to receive configuration instructions from an operator and communicate the configuration instructions to the wireless device 102 using the communication interface 124. In some examples, configuration module 124 may receive status information from the wireless device 102. The status information may be similar to that previously discussed with respect to the wireless device 102. The configuration module 124 may also communicate the status information to an operator. In this way, the wireless device 102 may maintain a sealed housing with minimal (if any) external indicators, while still allowing the operator a rich set of tools to configure, diagnose, and operate the wireless device 102.

In some examples, the configuration module 124 may communicate with an optional operator terminal 130. The communication may both entail receiving configuration instructions from an operator as well as communicating status information to the operator. In some examples, the operator terminal 130 may include a user interface to generate the configuration instructions. In some examples, the user interface may also display status information to the operator. The user interface may be implemented in software and run on appropriate hardware within the operator terminal 130. The operator terminal 328 may include hardware and software to communicate with the configuration device 120, such as through a wireless radio signal (e.g., WiFi or Bluetooth), induction (e.g., near-field magnetic induction communication ("NFMIC")), light (e.g., infrared), wire (e.g., Ethernet, USB, or serial connection), among others. In some examples, the operator terminal 130 may be a smart phone, a PDA, a laptop computer, a desktop computer, or other computer (including a collection of computers or cluster) or more specialized devices. Because the same configuration device 120 may be re-used over again with different wireless devices 102, it is not burdensome for the operator terminal 130 to connect to the configuration device 120 in a way which may require some one-time setup steps, such as associating the operator terminal 130 to the configuration device 120 using Bluetooth.

Figure 2:
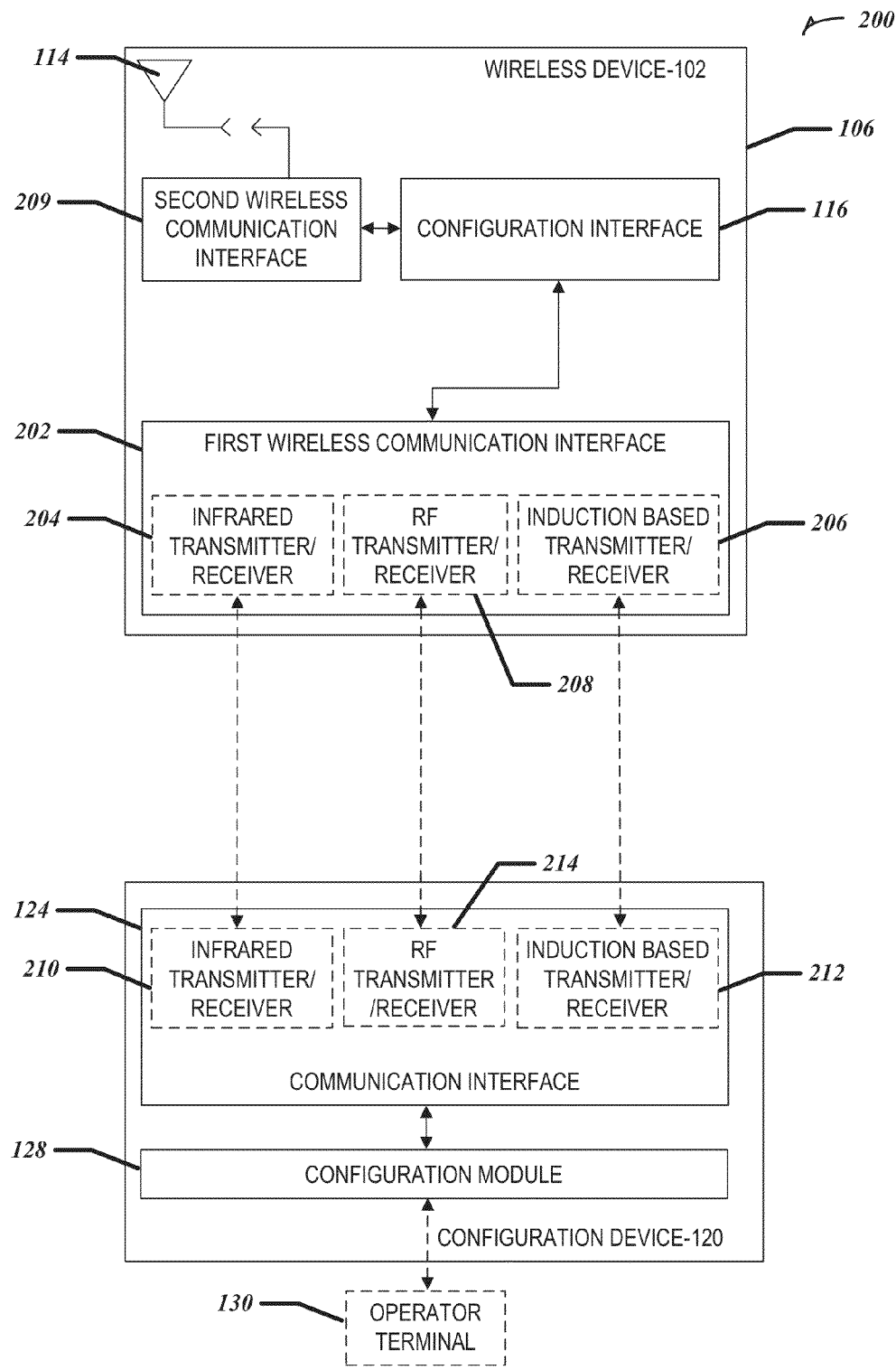
FIG. 2 illustrates a block diagram of example components in a wireless device and a configuration device according to one embodiment.

FIG. 2 illustrates a block diagram of example components in a system 200 with a wireless device 102 and a configuration device 120 according to one embodiment.

Wireless device 102 may have a housing 106, a first wireless communication interface 202, a second wireless communication interface 209, and a configuration interface 116. Housing 106 operates with the attributes previously discussed with respect to system 100.

First wireless communication interface 202 may be configured to use a first communications mechanism. The first wireless communication interface 202 may include hardware and software to communicate with other devices using the first communications mechanism. In some examples, the first wireless communication interface 202 may have an infrared transmitter and receiver 204, an induction based transmitter and receiver 206, a RF transmitter and receiver 208, or any combination of the three.

An example first communications mechanism may use the infrared transmitter and receiver 204. The first wireless communication interface 202 may contain software and hardware to drive the infrared transmitter and receiver 204. In some examples, a serial protocol may be used. Infrared may be an advantageous communication mechanism because it may be uniquely addressed by the configuration device 120 via line-of-sight. Infrared may also allow for an operator to stand, or otherwise be a comfortable distance from the wireless device 102 while it is being configured. Additionally, infrared may allow for the wireless device 102 to be plugged into an outlet 106 while the configuration device 102 is being configured. This may allow an operator 110 to determine if a mains power outlet is a good location for the wireless device 102 to operate. Further, several commercial handheld devices may serve as the configuration device, including personal digital assistants ("PDAs") or smart phones with an infrared transmitter and receiver. In some examples, the housing 106 may be sealed as a window, or the transmitter and receiver 312 themselves, may be manufactured into the housing in order to maintain a seal.

Another example first communications mechanism may use the induction based transmitter and receiver 206. The first wireless communication interface 202 may contain software and hardware to drive the induction based transmitter and receiver 206. In some examples, the induction based mechanism may be known as near-field magnetic induction communication ("NFMIC"). In some examples, NFMIC may have a range of two meters or less. In other examples, standard radio frequency modulation schemes may be used to communicate over NFMIC. NFMIC may be advantageous as it may allow secure communication within its magnetic field, using little power, allowing greater flexibility of physical arrangements between the wireless device 102 and the configuration device 104, all while maintaining the seal on the sealed housing of the wireless device 102.

Another example first communications mechanism may use the RF based transmitter and receiver 206. In some examples, the first wireless communication interface 202 is pre-configured to communicate with the configuration device 120 using a radio frequency. In these examples, the stable and static nature of the configuration device 120 may allow the pre-configuration to be universal so as to reduce manufacturing costs. In some examples, one of the Bluetooth Special Interest Group protocols ("Bluetooth") may be used.

Second wireless communication interface 209 may be capable of connecting the wireless device 102 to a wireless network via a second communications mechanism. Second wireless communication interface 209 operates similarly to the wireless communication interface 112 discussed above with respect to system 100 except that it is limited such that the second communications mechanism is different than the first communications mechanism. This is allows the wireless device 102 to remain flexible as to the wireless networks it may connect to using the second communications mechanism, as well as remain flexible as to configuration, while allowing the first communications mechanism to be inflexible so as to reduce pre-configuration and thus manufacturing costs on that configuration channel. In some examples, second wireless connection interface 209 may be coupled to antenna 114, as previously described with respect to wireless communication interface 112 in system 100.

Configuration interface 116 may be coupled to the first wireless connection interface 202 and the second wireless connection interface 209. In some examples, the configuration interface 116 may communicate with the configuration device 120 using the first communications mechanism to receive configuration instructions. The configuration interface 116 may then configure the second wireless communication interface 209 to connect to the wireless network based on the configuration instructions. In some examples, the configuration interface 116 may communicate status information to the configuration device 120. In some examples, the status information may include wireless signal strength, or diagnostic information from the wireless device 102 (e.g., operating parameters, error conditions, serial number, etc. of the wireless device).

Configuration device 120 may have a communication interface 124, and a configuration module 128.

Communication interface 124 may be capable of communicating with the wireless device 102 using the first communications mechanism. In some examples, the communication interface may include software and hardware to communicate using the first communications mechanism. In some examples, the communication interface 124 may have an infrared transmitter and receiver 210, an induction based transmitter and receiver 212, a RF transmitter and receiver 214, or any combination of the three. The infrared transmitter and receiver 210, an induction based transmitter and receiver 212, a RF transmitter and receiver 214, may operate as previously described with respect to infrared transmitter and receiver 204, induction based transmitter and receiver 206, and RF transmitter and receiver 214.

Configuration module 128 and operator terminal 130 may operate as previously described with respect to system 100.

The components described, with respect to the wireless device 102 and the configuration device 120, in example systems 100 and 200 may be used in any combination. For example, a wireless device 102 may include both a power line capable configuration interface 116 as well as a first wireless communication interface 202 with an induction based transmitter and receiver 206.

Figure 4A:
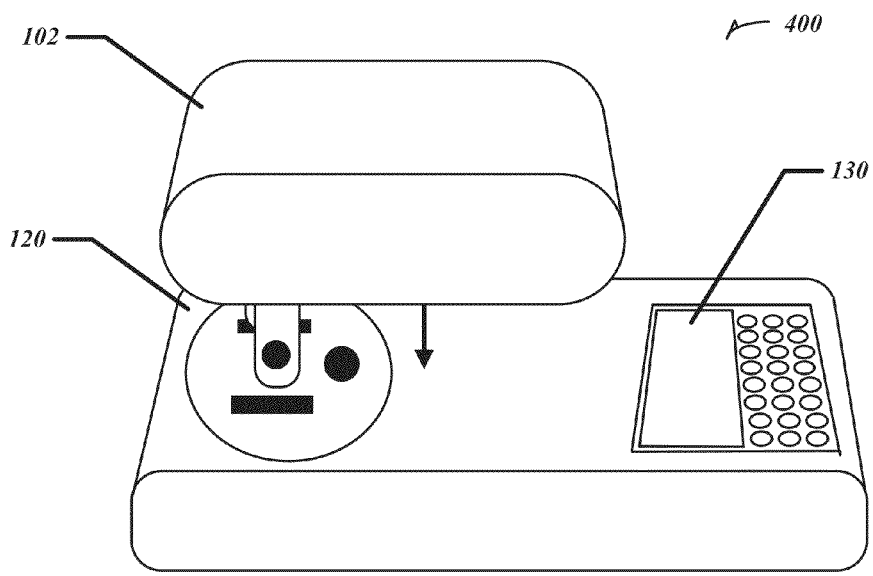
FIGS. 4a-4b illustrate further example systems to configure a wireless device.
Figure 4B:
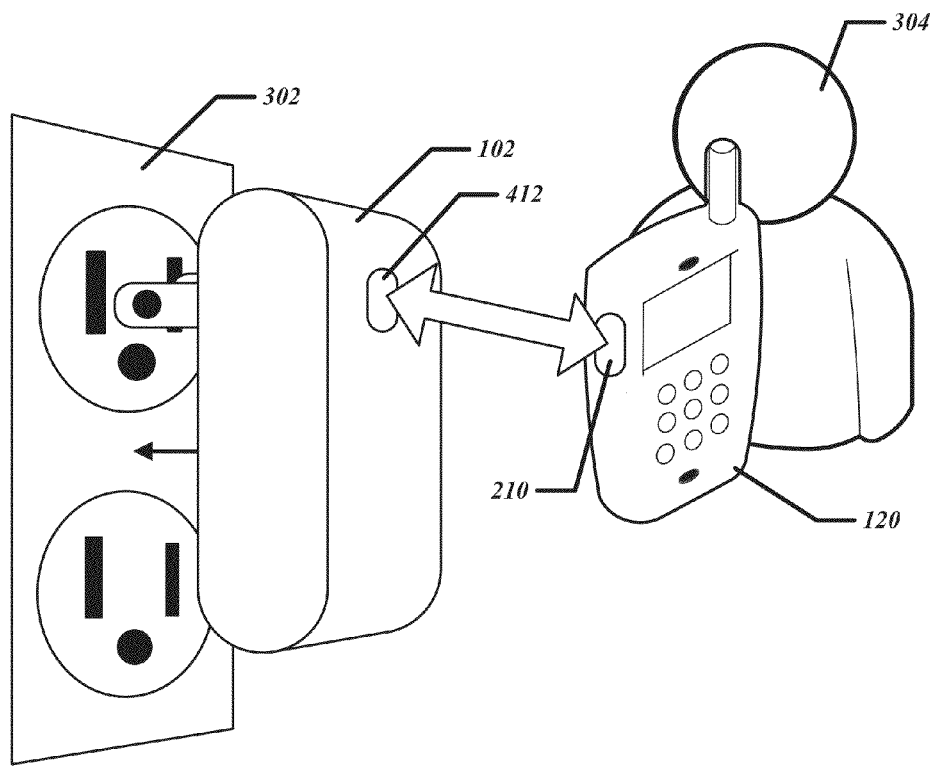

FIGS. 3-4b illustrate several possible physical configurations of the wireless device 102, the configuration device 120 and optionally an operator terminal 130. However, additional physical configurations are also contemplated, including a cover (e.g., sleeve, or a shape to simply sit atop, or attach to, the wireless device 102) for the wireless device 102 that allows the wireless device 102 to plug directly into the outlet 302. In this example, an infrared, induction, or RF based mechanism may be employed to connect the configuration device to the wireless device 102. It will be understood that any physical configuration allowing the configuration device 120 to communicate the configuration instructions to the wireless device 102 using the power line based communications, or the first communications mechanisms, described above is contemplated.

FIG. 3 illustrates an example system 300 to configure a wireless device. In some examples, the some or all of the components of systems 100 and 200 may be used in system 300. A wireless device 102 may be plugged into a configuration device 120 which in turn plugs into a mains power outlet ("outlet") 302. An operator terminal 130 may also be communicatively coupled to the configuration device 120 to be used by an operator 130. In this example the configuration device 120 both powers the wireless device 120 during configuration and holds the wireless device 102 proximate to the outlet 302. Further, this example illustrates the physical separation of the operator terminal 130 and the configuration device 120. In some examples, the operator terminal 130 and the configuration device 120 may be connected using RF, infrared, or induction. In other examples, the operator terminal 130 may connect to the configuration device via a wired connection, such as with a USB cable, other serial connection, or other wired connections. This configuration advantageously allows: 1) the configuration device 120 to communicate with the wireless device using any of the previously mentioned first communications means, or via the power line; 2) holding the wireless device 102 proximate to its final operating position while the wireless device 102 is being configured, allowing the operator 304 to accurately configure the wireless device 102; and 3) to allow the operator 304 to maintain a comfortable position (e.g., standing or sitting a few feet away) as opposed to having to crouch or stretch to reach the outlet 302.

FIG. 4a illustrates another example system 400 to configure a wireless device. In this example, the wireless device 102 may be plugged into a configuration device 120. Configuration device 120 may include batteries to power itself and the wireless device 102. This may allow an operator 304 to walk around the environment of a wireless network to locate outlets 302 appropriate for the wireless device 102. In some examples, the configuration device 120 may also incorporate an operator terminal 130. This may allow for a compact and convenient package for the operator 304 to use in configuring the wireless device 102. The configuration device 120 and the wireless device 102 may include some or all of the components previously discussed to communicate with each other.

FIG. 4b illustrates another example system 410 to configure a wireless device. In this example, the wireless device 102 may be plugged directly into the outlet 302, where it is likely to remain during its operation. The wireless device 102 is shown with an infrared transmitter and receiver 204 operating through a window 412 integrated into the housing 106 of the wireless device 102. In some examples, the infrared transmitter and receiver 210 may be directly integrated into the housing 106. The configuration device 120 may include an infrared transmitter and receiver 210 as well. In some examples, the configuration device 120 is also the operator terminal 130; i.e., they are the same physical device. For example, the configuration device 120 may be a smart phone with an infrared transmitter and receiver, plus the hardware and software to provide the configuration module 128, user interface, and communication interface 124 to receive configuration instructions from the operator 304, and transmit them to the wireless device 102. The other wireless communications mechanisms previously described (e.g., induction based or RF) could also be used. This example may provide the benefits of configuring the wireless device in the place it will be operating, as well as providing a small and convenient package for operators 110.

Figure 5A:
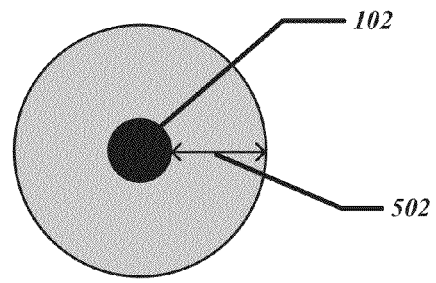
FIGS. 5a-5b illustrate an example environment in which a wireless device may be deployed.
Figure 5B:
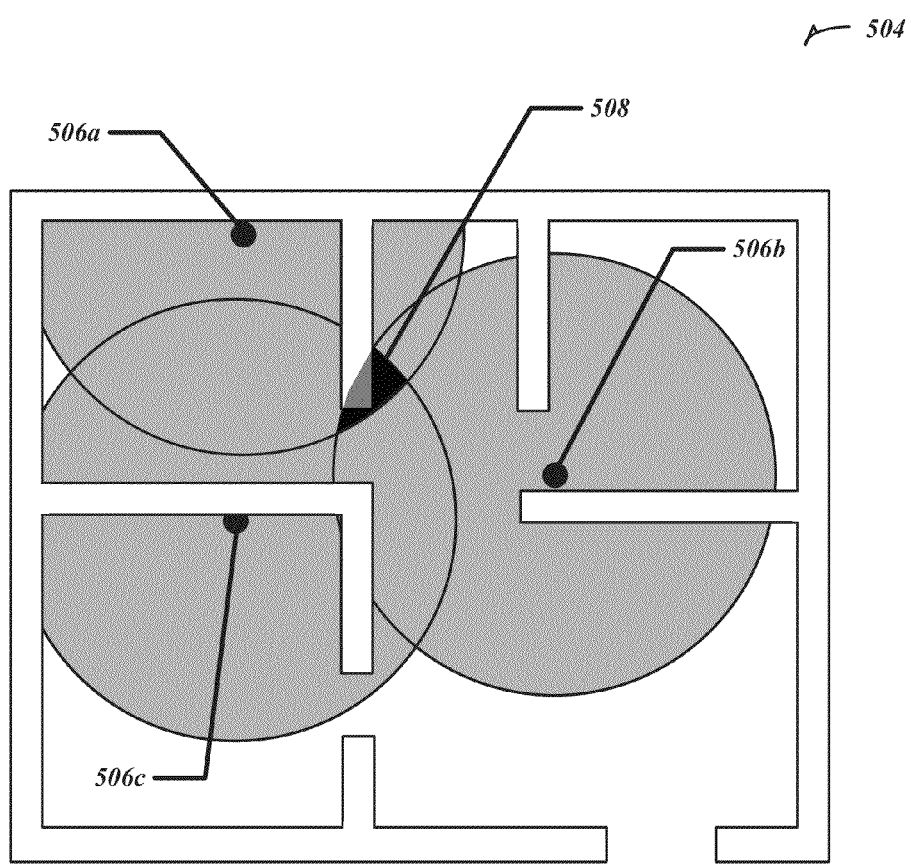

FIGS. 5a-5b illustrate an example wireless network environment in which a wireless device 102 may be deployed. FIG. 5a illustrates a wireless device 102 encircled by its wireless coverage area (shown as a grey circle) with a range 502. The range 502 indicates the effective communication distance between the wireless device 102 and a receiving device. That is, if the receiving device is not within the range 502, it is unlikely that it will receive a transmission from wireless device 102. In a mesh network, for example, each mesh device may be placed within the range of another, and communications between two devices may be routed through intermediate devices if the two devices are not within range of each other. In other wireless network arrangements, the wireless device 102 may be placed so as to put a wireless access point, for example, within range 502. It will be understood that the range 502 may be affected by a number of factors, including the operating frequency of the wireless device 102, the power of the wireless signal, and environmental factors such as obstructions (e.g., walls, desks, and cabinets) or interference from other wireless signals.

FIG. 5b illustrates an example environment 504 in which the wireless device 102 may be deployed. Wireless devices 506a-506c may be other wireless devices in this environment 504. Wireless coverage areas for wireless devices 506a-506c are shown as filled grey circles surrounding each device. The environment 504 also illustrates several possible wireless signal obstructions as walls. The shaded area 508 indicates a convergence of wireless coverage between the wireless devices 506a-506c. If this environment 504 were an office, for example, and the wireless devices 506a-506c were SE devices operating on a mesh network, they may need another wireless device to connect them together as their wireless coverage does not overlap each other. This is a situation where an operator 304, deploying the wireless device 102 may walk around the office 504 and test outlets 302 for appropriate installation locations of the wireless device 102. In other examples, a battery powered configuration device 120 may allow the operator 304 to move around the office 504 and discover area 508, through the communicated status information, from the wireless device 102 to the configuration device 120 and optionally to the operator terminal 130. Further, as shown in environment 504, the desired installation location 508 may be in a high traffic area (in this example the position of 508 indicates it is outside of an office in a public area). Sealing the wireless device's 102 housing 106 may prevent unauthorized configuration of the wireless device 102, as well as simply provide a more robust package capable of withstanding incidents common to installation in high traffic areas (e.g., bumping, spilling, etc.).

FIG. 6 illustrates a swim-lane flowchart for an example method 600 to configure a wireless device. The example devices and components shown in FIGS. 1-4b may be used to implement method 600, although other devices and components are also contemplated. In some examples, the wireless device 102 described may have a sealed housing 106 with only electrical conductors associated with mains power exiting the housing.

At 602 the configuration module 128 may receive configuration instructions from an operator 304.

At 604, the configuration instructions may have optionally been generated at an operator terminal 130. The configuration device 120 may communicatively couple with the operator terminal 130. In some examples, communicatively coupling may include establishing a RF, magnetic, light, or wired connection between the configuration device 120 and the operator terminal 130. Communicatively coupling may also entail establishing communications, such as negotiating a TCP/IP session, or through another communications protocol. The operator terminal 130 may include a user interface to generate the configuration instructions. The operator terminal 130 may also include hardware and software to implement the user interface, including a display and input device to enable it to interface with an operator 304.

At 606, the communication interface 124 may communicate the configuration instructions to the wireless device 102. In some examples, the configuration interface 116, or the first wireless communication interface 202, may have a receiver that is always receptive to a connection by the communication interface 124. In other examples, the configuration interface 116, or the first wireless communication interface 202, receiver is receptive for a period of time after the wireless device 102 has been rebooted, or reset, for example by unplugging the wireless device 102. The configuration instructions may be communicated by the communication interface by modulating power on an electrical connection 108 between the configuration device 120 and the wireless device 102, or using the first communications mechanism, as previously described.

At 610 the configuration interface 116, after receiving the configuration instructions directly or via the first wireless communication interface 202, may configure the wireless device 102 based on the received configuration instructions. In some examples, configuring the wireless device 102 includes configuring the wireless communication interface 112 or the second wireless communication interface 209. In some examples, configuring the wireless device 102 may include setting wireless network parameters, such as network address, netmask, and gateway, as well as device parameters, such as power behavior.

At 612 the configuration interface 116 may optionally transmit status information, possibly via the first wireless communication interface 202 using the first communications mechanism, about the wireless device 102, back to the configuration device 120. In some examples, the status information may include wireless signal strength, or diagnostic information about the wireless device 102. The status information may include any additional information that is captured or stored by the wireless device 102.

At 614 the configuration device 120 may optionally receive, via the electrical conductor 108 or the first communications mechanism, the status information and communicate it to the operator 304. In some examples, the configuration module 319 communicates the status information to the operator terminal 130 after the operator terminal 130 has communicatively coupled with the configuration device 120.

At 616 the operator terminal may optionally display the status information to the operator 304. In some examples, the operator terminal 130 includes a user interface to display the status information and allow the operator 304 to conveniently consume the status information. For example, the user interface may include menus allowing the operator 304 to select one or more areas of data to peruse. The user interface for displaying the status information may also integrate with the user interface to generate the configuration instructions, thus allowing the operator 304 a convenient way of both observing the current status of the wireless device 102 and to tailor the configuration instructions based on that current status.

More and more small wireless devices are being deployed throughout buildings for various purposes. Protecting these devices from tampering, accidental or otherwise, while still maintaining flexibility in deployment options, may be achieved by sealing the housing of the wireless device, while providing a configuration mechanism that provides a rich configuration experience for operators without requiring individual pre-configuration, such as default network addresses, which may ultimately interfere with each other and a wireless network. Using connection technologies which allow the configuration device to address the wireless device to be configured through a physical relationship (e.g., line-of-sight, proximity, or direct wired connections) between the two devices, provides the sought after deployment flexibility. Further, sealing the housing, and limiting external conductors to those associated with mains power, allows for a cheaper and robust product more capable of withstanding the rigors of a variety of deployment environments.

Additional Notes

The above detailed description includes references to the accompanying drawings, which form a part of the detailed description. The drawings show, by way of illustration, specific embodiments in which the invention can be practiced. These embodiments are also referred to herein as "examples."

Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A wireless device comprising:
    a housing, wherein the housing is configured to be mounted to an outlet supplying power to the wireless device;
    a first wireline communication interface including a power line transmitter and receiver configured to implement a first communications mechanism;
    a second wireless communication interface capable of connecting the wireless device to a wireless network via a second communications mechanism; and
    a configuration interface coupled to the first communication interface and the second wireless communication interface, wherein a configuration device communicates configuration instructions to the wireless device using the first communications mechanism, and wherein the second wireless interface is configured, by the configuration interface, to connect to the wireless network using the second communications mechanism based on the configuration instructions.

2. The wireless device of claim 1, wherein the housing is permanently sealed and closed.

3. The wireless device of claim 1, wherein the configuration interface communicates status information to the configuration device via the first communication interface using the first communications mechanism.

4. The wireless device of claim 3, wherein the status information includes at least one of wireless signal strength or diagnostic information.

5. The wireless device of claim 1, wherein the wireless network is a mesh network.

6. The wireless device of claim 1, wherein the first communication interface further includes an infrared transmitter and receiver, configured to implement the first communications mechanism.

7. The wireless device of claim 1, wherein the first communication interface further includes a radio frequency transmitter and receiver, configured to implement the first communications mechanism.

8. The wireless device of claim 1, wherein the first communication interface is preconfigured to communicate with the configuration device.

9. The wireless device of claim 1, wherein the first communication interface further includes an induction based transmitter and receiver, configured to implement the first communications mechanism.

10. A configuration device comprising:
    a communication interface capable of communicating with a wireless device using a first wireline communications mechanism, the first wireline communications mechanism including a power line transmitter and receiver to send and receive data, wherein the wireless device is capable of communicating with a wireless network using a second wireless communications mechanism, and wherein the wireless device includes a housing to mount the wireless device to an outlet supplying power to the wireless device; and
    a configuration module to:
    receive, from an operator, configuration instructions for the wireless device; and
    communicate, using the communication interface, the configuration instructions to the wireless device using the first wireless communications mechanism.

11. The configuration device of claim 10, wherein the first communications mechanism further includes an infrared transmitter and receiver to send and receive data.

12. The configuration device of claim 10, wherein the first communications mechanism further includes a radio frequency transmitter and receiver to send and receive data.

13. The configuration device of claim 12, wherein the wireless device is preconfigured to communicate with the configuration device using the first communications mechanism.

14. The configuration device of claim 10, wherein to communicate the configuration instructions to the wireless device includes receiving status information from the wireless device via the communication interface and communicating the status information to the operator.

15. The configuration device of claim 14, wherein the status information includes at least one of wireless signal strength or diagnostic information.

16. The configuration device of claim 10, wherein to receive the configuration instructions includes communicating with an operator terminal, and wherein the operator terminal includes a user interface to generate configuration instructions and display status information.

17. The configuration device of claim 10, wherein the first communications mechanism further includes an induction based transmitter and receiver to send and receive data.

18. A system comprising:
one or more wireless devices capable of operating as a wireless network, wherein each wireless device comprises:
a housing, wherein the housing is configured to be mounted to an outlet supplying power to the wireless device;
a first wireline communication interface capable of using a first wireline communications mechanism including a power line transmitter and receiver to send and receive data;
a second wireless communication interface capable of connecting the wireless device to a wireless network via a second communications mechanism; and
a configuration interface coupled to both the first communication interface and the second wireless communication interface; and
a configuration device comprising:
a communication interface capable of communicating with the wireless device using the first communications mechanism; and
a configuration module to:
receive, from an operator, configuration instructions for the wireless device; and
communicate, using the communication interface, the configuration instructions to the wireless device using the first communications mechanism, wherein the second wireless interface is configured, by the configuration interface, to connect to the wireless network using the second communications mechanism based on the configuration instructions.

19. The system of claim 18, wherein the first communications mechanism further includes an infrared transmitter and receiver to send and receive data.

20. The system of claim 18, wherein the first communications mechanism further includes a radio frequency transmitter and receiver to send and receive data.

21. The system of claim 20, wherein the wireless device is preconfigured to communicate with the configuration device using the first communications mechanism.

22. The system of claim 18, wherein the first communications mechanism further includes an induction based transmitter and receiver to send and receive data.

23. In a system with a wireless device comprising a configuration interface coupled to both a first communication interface capable of using a first communications mechanism and a second wireless communication interface capable of using a second communications mechanism, and a configuration device comprising a configuration module and a communication interface, a method to configure the wireless device comprising:
receiving, from an operator via the configuration module, configuration instructions for the wireless device;
communicating, using the communication interface, the configuration instructions to the wireless device using the first wireline communications mechanism, the first wireline communications mechanism using power line communications to transmit and receive data; and
configuring, using the configuration interface, the second communication interface to connect the wireless device to a wireless network using the second communications mechanism based on the configuration instructions.

24. The method of claim 23, wherein the wireless network is a mesh network.

25. The method of claim 23, wherein the first communications mechanism further uses infrared light to transmit and receive data.

26. The method of claim 23, wherein the first communications mechanism further uses radio frequencies to transmit and receive data.

27. The method of claim 26, wherein the first communication interface is preconfigured to communicate with the configuration device.

28. The method of claim 23, wherein communicating the configuration instructions to the wireless device includes receiving status information from the wireless device via the communication interface using the first communications mechanism and communicating the status information to the operator.

29. The method of claim 28, wherein the status information includes at least one of wireless signal strength or diagnostic information.

30. The method of claim 23, wherein receiving the configuration instructions includes communicating with an operator terminal, and wherein the operator terminal includes a user interface to generate configuration instructions and display status information.

31. The method of claim 23, wherein the first communications mechanism further uses induction to transmit and receive data.

* * * * *